United States Patent Office 2,712,949
Patented July 12, 1955

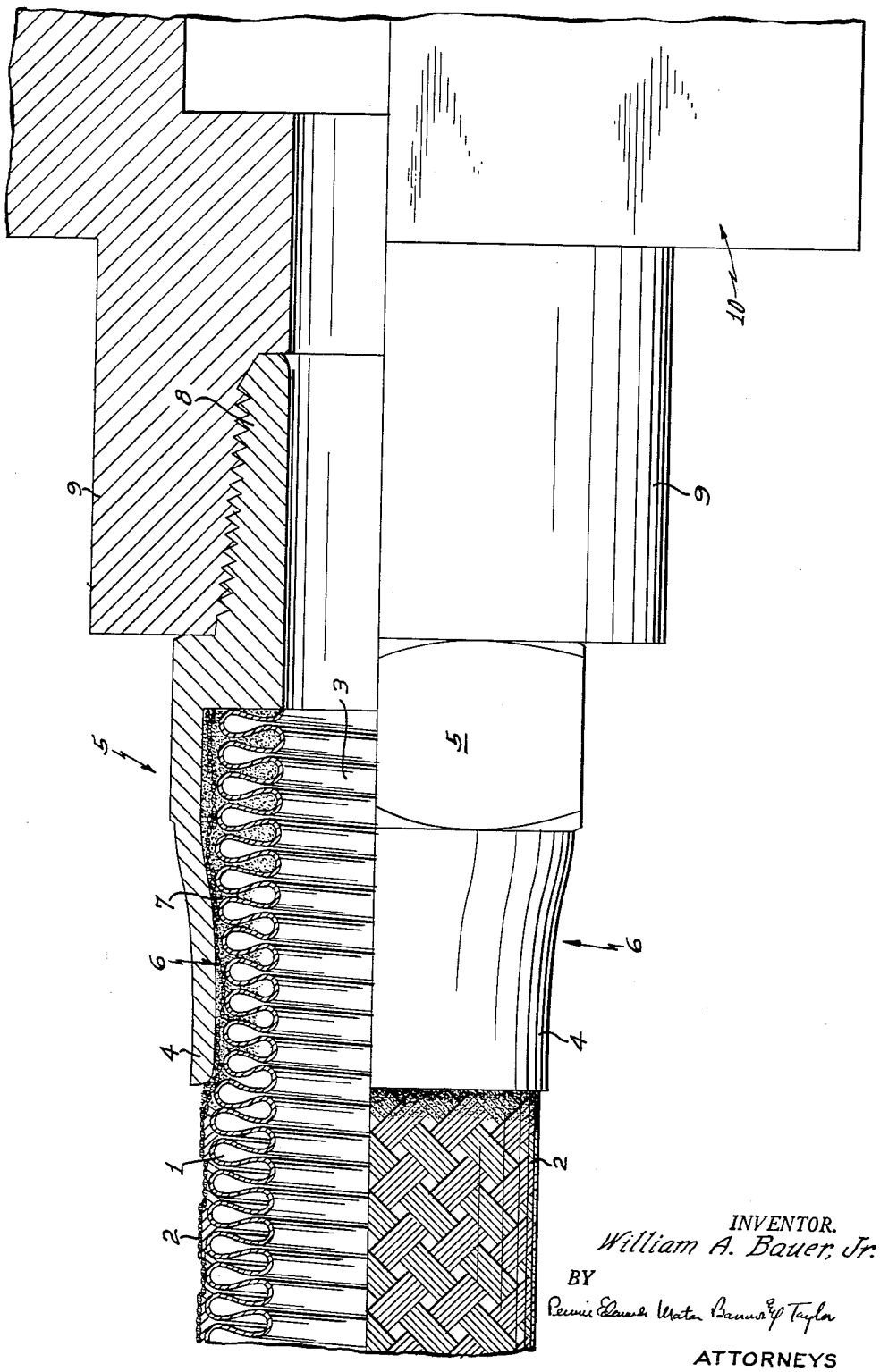

2,712,949
HIGH TEMPERATURE METAL HOSE CONNECTION

William A. Bauer, Jr., Seymour, Conn., assignor to The American Brass Company, a corporation of Connecticut Application July 25, 1952, Serial No. 300,935

3 Claims. (Cl. 285—74)

This invention relates to flexible metal hose connections which are employed for high temperature service. The new hose connection comprises a hollow cylindrical coupling which is compressed about an end portion of the flexible metal hose to provide a mechanically strong joint between the coupling and the hose, the joint being sealed by metallic solder which penetrates its capillary interstices and which may have a lower softening temperature than the temperature of the fluid conveyed through the hose connection. The resulting assembly is capable of operating successfully at elevated temperatures at which the solder alloy, which is employed solely as a sealant, is so weak mechanically as to be unable to contribute to the mechanical strength of the joint.

Flexible metal hose intended to convey fluids such as steam or engine exhaust gases at elevated temperatures, say above 300° F., has heretofore been joined to the couplings and other fittings by means of high temperature solders or the like. High temperature solders, such as silver solders and brazing alloys, melt in the range from 1300° F. to 1700° F. In the use of these solders to form joints, the metallic hose itself must be heated to temperatures in the melting range of the solders in order to form the joint. Consequently, the flexible conduit is likely to be annealed by the soldering operation to such an extent that it is less efficient in flexure and may fail in service requiring repeated bending. In the case of the strip wound and packed type of flexible conduit or hose, the packing may be charred enough by heating the hose to such high soldering temperatures that leakage may result. Therefore, it is desirable to employ soft tin-lead solders which melt over a low temperature range, rather than high temperature solders, in forming joint assemblies for flexible metal hose.

However, when soft solders, i. e. those which melt in the temperature range from 350° F. to 500° F., are used to make soldered metal hose joints, the maximum operating temperature at which the joint can be relied on for mechanical strength has been established and accepted as about 280° F. or less, due to the high rate of creep or cold flow of this type of joining alloy at higher temperatures. Thus, it is evident that in applications where operating temperatures are in excess of 280° F., it has heretofore been deemed necessary to use high temperature soldering methods such as silver soldering or brazing.

I have discovered that if a coupling or other fitting is securely attached to a flexible metal hose by swaging or crimping it thereto, and if the resulting joint is sealed against the leakage of fluids by introducing a soft solder alloy into its interstices, the solder functions as a very effective sealant even at temperatures above its softening temperature and up substantially to its flow point. Such joints, I have found, can be operated reliably and with safety at temperatures approaching the flow point of the solder.

Based on these discoveries, the present invention provides the combination with a source of fluid at an elevated temperature, of a hose connection through which said fluid is conveyed comprising a cylindrical metal coupling attached at one end to said source and having at its other end a sleeve into which the end portion of a flexible metal hose is inserted. The sleeve is swaged into mechanically interlocked engagement with the hose, in order to form a mechanically strong joint between the coupling and the hose, and a metallic solder alloy having a softening temperature below and a flow point above the temperature of the fluid conveyed through the hose connection penetrates into and seals such swaged joint. In the resulting assembly, the swaging of the sleeve to the hose is alone relied on to provide the mechanical strength of the joint, and the solder serves only to prevent leakage of fluid through the joint, without contributing any mechanical strength to the joint. Such joint functions with complete reliability even though in its normal operation the solder is at a temperature substantially above what is ordinarily deemed its upper serviceable limit and up to its flow point.

The term "softening temperature" as used herein with respect to the solder is the temperature at which the solder begins to melt. It is thus used to denote the temperature at which the solidus line (of a binary solder alloy) or the solidus surface (of a ternary solder alloy) intersects the composition line in a phase diagram or model of the solder alloy. By the term "flow point" I mean the temperature at which the solder is completely melted and free-flowing.

An advantageous embodiment of the invention is described below and is shown in the accompanying drawing, the single figure of which shows, in partial section, an elevation of the joint assembly attached to a source of fluid at an elevated temperature and pressure.

In the drawing a seamless corrugated flexible metal hose 1 of the helically corrugated type, surrounded by a wire braid 2, is shown with an end portion 3 of the hose and the corresponding end portion of the braid inserted into a hose-receiving sleeve 4 of a fitting or coupling 5. The sleeve 4 is tightly swaged against the flexible metal hose 1, as shown at 6, so that the hose, the braid, and the sleeve of the coupling are all securely interlocked and a mechanically strong joint is made between them. But a network of interstices of capillary dimensions remains between the corrugations of the hose, the wire strands of the braid, and the sleeve. A soft solder alloy 7 penetrates into these capillary interstices and acts solely as a sealant to prevent the leakage of fluid therethrough.

The joint may be formed by the usual methods of swaging and soldering. After the sleeve has been swaged to the end of the hose, a hand torch and a stick of solder are employed to flow the solder between the sleeve 4 and the hose 1 into the convolutions of the wall of the corrugated hose and between and around the wire strands of the braid 2.

The male end portion 8 of the coupling 5, opposite the sleeve 4, is externally threaded and is attached to the internally threaded connection 9 of a source 10 of fluid, such as stream or engine exhaust gases, at an elevated temperature above the softening point of the solder 6. The joint between the hose 1 and the coupling sleeve 4 is capable of operating successfully and without leakage at such elevated temperatures since the solder functions solely as a seal, the mechanical strength of the assembly being provided by the swaging of the sleeve to the wall of the hose. The solder even in its plastic condition at temperatures above its softening point and up to its flow point prevents the fluid conveyed through the hose from flowing out between the sleeve and the hose, even when the pressure of such fluid is substantial. For example, a solder alloy of 20% tin and 80% lead, which has a softening temperature of about 360° F. and a flow point of about 530° F., has been used successfully to seal swaged joints of the character just described in metal hose installations through which steam at 475° F. and under pressure of 350 pounds per square inch has been conveyed for 100 hours or more.

Swaged and soft-soldered assemblies as described above are cheaper to produce than brazed assemblies and have the additional advantage of requiring less-skilled labor for their manufacture. They are suitable for use in a wide variety of installations such as Diesel engine exhausts, hot air heaters, laundry and dry cleaning presses, and other apparatus in which fluids at high temperatures are handled. Furthermore, it has also been found that such soldered joints have a longer service life than brazed joints, since the metal hose adjacent to a soft-soldered joint is not appreciably annealed in forming the joint, whereas brazed joints necessarily become substantially annealed during their manufacture. Annealing materially reduces the flexure life of corrugated metal hose, and failure of such hose that is provided with fittings attached by brazing generally occurs in the region where the hose was annealed incidentally to attaching the fitting. Failure of the this type do not occur in flexible hose attached to fittings by the swaged and soldered joint herein described.

I claim:

1. The combination with a source of fluid at an elevated temperature, of a hose connection through which said fluid is conveyed comprising a cylindrical metal coupling attached at one end to said source and having a sleeve at its other end, a flexible metal hose having its end portion inserted into said sleeve, said sleeve being swaged into interlocked engagement with said hose and thereby forming a mechanically strong joint between said coupling and said hose, and metallic solder alloy having a softening temperature below and a flow point above the temperature at which said fluid is adapted to be conveyed through said hose connection penetrating into and sealing said swaged joint, whereby said solder seals said joint against leakage of fluid without contributing to the mechanical strength of the joint.

2. The combination with a source of fluid at an elevated temperature, of a hose connection through which said fluid is conveyed comprising a cylindrical metal coupling attached at one end to said source and having a sleeve at its other end, a corrugated flexible metal hose communicating with said source of fluid through said coupling, said hose being surrounded by a braided wire sheath, one end portion of both the hose and the braided sheath being inserted into said sleeve, said sleeve being swaged into interlocked engagement with both said braid and said hose and thereby forming a mechanically strong joint between said coupling and said hose, and metallic solder alloy having a softening temperature below and a flow point above the temperature at which said fluid is adapted to be conveyed through said hose connection penetrating into and sealing said swaged joint, whereby said solder seals said joint against leakage of fluid without contributing to the mechanical strength of the joint.

3. The combination with a source of fluid at an elevated temperature, of a flexible metal hose through which said fluid is conveyed, and means connecting said source with said hose comprising a coupling having a sleeve which surrounds an end portion of the hose, characterized in that said sleeve is swaged into interlocking engagement with said hose, whereby a mechanically strong but fluid-permeable joint is formed between said sleeve and said hose, and further characterized in that a metallic solder having a softening temperature below and a flow point above the temperature at which said fluid is adapted to be conveyed through said coupling penetrates into and seals said joint against leakage therethrough of said fluid.

References Cited in the file of this patent

UNITED STATES PATENTS

| | | |
|---|---|---|
| 1,911,775 | Smith | May 30, 1933 |
| 2,142,357 | Jacobson | Jan. 3, 1939 |
| 2,149,043 | Cadwell | Feb. 28, 1939 |